(12) United States Patent
Pant et al.

(10) Patent No.: US 9,164,604 B2
(45) Date of Patent: Oct. 20, 2015

(54) TUNING ALGORITHM FOR NOISE REDUCTION IN AN ACTIVE STYLUS

(71) Applicant: Atmel Corporation, San Jose, CA (US)

(72) Inventors: Vivek Pant, San Jose, CA (US); Trond Jarle Pedersen, Trondheim (NO); Vemund Kval Bakken, San Jose, CA (US); Kishore Sundara-Rajan, San Jose, CA (US)

(73) Assignee: Atmel Corporation, San Jose, CA (US)

(*) Notice: Subject to any disclaimer, the term of this patent is extended or adjusted under 35 U.S.C. 154(b) by 0 days.

(21) Appl. No.: 14/076,892

(22) Filed: Nov. 11, 2013

(65) Prior Publication Data

US 2014/0062970 A1 Mar. 6, 2014

Related U.S. Application Data

(63) Continuation of application No. 13/427,721, filed on Mar. 22, 2012, now Pat. No. 8,581,886.

(60) Provisional application No. 61/553,114, filed on Oct. 28, 2011.

(51) Int. Cl.
*G06F 3/033* (2013.01)
*G06F 3/038* (2013.01)
*G06F 3/0354* (2013.01)

(52) U.S. Cl.
CPC .......... *G06F 3/0383* (2013.01); *G06F 3/03545* (2013.01); *G06F 2203/0384* (2013.01)

(58) Field of Classification Search
CPC ................... G06F 2203/0384; G06F 3/03545; G06F 3/0383
USPC ............ 345/156, 173–179; 178/19.01–20.04
See application file for complete search history.

(56) References Cited

U.S. PATENT DOCUMENTS

| 4,642,459 | A | 2/1987 | Caswell et al. |
| 4,695,680 | A | 9/1987 | Kable |
| 5,973,677 | A | 10/1999 | Gibbons |
| 7,612,767 | B1 | 11/2009 | Griffin |

(Continued)

FOREIGN PATENT DOCUMENTS

WO WO2012/129247 9/2012

OTHER PUBLICATIONS

Kyung, Ki-Uk et al., "wUbi-Pen : Windows Graphical User Interface Interacting with Haptic Feedback Stylus," *SIGGRAPH,*, Los Angeles, California, Aug. 2008.

(Continued)

*Primary Examiner* — Dmitriy Bolotin
(74) *Attorney, Agent, or Firm* — Baker Botts L.L.P.

(57) ABSTRACT

In one embodiment, a stylus receives a signal, the stylus being able to wirelessly transmit signals to and receive signals from a device, and the stylus having a plurality of electrodes disposed in a tip of the stylus. The stylus compares a first value of the signal to a first threshold and determines whether to start a timing period based at least in part on this comparison. If the timing period is started, the stylus compares a second value of the signal to a second threshold and determines whether to stop the timing period based at least in part on this second comparison. If the timing period is stopped, the stylus determines whether the duration of the timing period is within a pre-determined range of timing period values. If so, the stylus processes the signal.

20 Claims, 6 Drawing Sheets

(56) References Cited

U.S. PATENT DOCUMENTS

| | | |
|---|---|---|
| 7,663,607 B2 | 2/2010 | Hotelling |
| 7,875,814 B2 | 1/2011 | Chen |
| 7,920,129 B2 | 4/2011 | Hotelling |
| 8,031,094 B2 | 10/2011 | Hotelling |
| 8,031,174 B2 | 10/2011 | Hamblin |
| 8,040,326 B2 | 10/2011 | Hotelling |
| 8,049,732 B2 | 11/2011 | Hotelling |
| 8,089,008 B2 | 1/2012 | Katsurahira |
| 8,179,381 B2 | 5/2012 | Frey |
| 8,581,886 B2 * | 11/2013 | Pant et al. ................. 345/179 |
| 2006/0177112 A1 | 8/2006 | Yang et al. |
| 2008/0238885 A1 | 10/2008 | Zachut |
| 2009/0065268 A1 | 3/2009 | Katsurahira |
| 2009/0095540 A1 | 4/2009 | Zachut |
| 2009/0115725 A1 | 5/2009 | Shemesh |
| 2009/0127005 A1 | 5/2009 | Zachut |
| 2009/0153152 A1 | 6/2009 | Maharyta |
| 2009/0184939 A1 | 7/2009 | Wohlstadter |
| 2009/0251434 A1 | 10/2009 | Rimon |
| 2009/0315854 A1 | 12/2009 | Matsuo |
| 2010/0006350 A1 | 1/2010 | Elias |
| 2010/0155153 A1 | 6/2010 | Zachut |
| 2010/0292945 A1 | 11/2010 | Reynolds |
| 2010/0315384 A1 | 12/2010 | Hargreaves |
| 2011/0007029 A1 | 1/2011 | Ben-David |
| 2012/0242588 A1 | 9/2012 | Myers |
| 2012/0242592 A1 | 9/2012 | Rothkopf |
| 2012/0243151 A1 | 9/2012 | Lynch |
| 2012/0243719 A1 | 9/2012 | Franklin |
| 2012/0327041 A1 | 12/2012 | Harley |

OTHER PUBLICATIONS

Lee, Johnny C. et al., "Haptic Pen: A Tactile Feedback Stylus for Touch Screens," *UIST '04*, vol. 6, Issue 2, Santa Fe, New Mexico, Oct. 2004.

U.S. Appl. No. 61/454,936, filed Mar. 21, 2011, Myers.

U.S. Appl. No. 61/454,950, filed Mar. 21, 2011, Lynch.

U.S. Appl. No. 61/454,894, filed Mar. 21, 2011, Rothkopf.

Song, Hyunyoung et al., "Grips and Gestures on a Multi-Touch Pen," *CHI 2011, Session: Flexible Grips & Gestures*, Vancouver, BC, Canada, May 2011.

Tan, Eng Chong et al., "Application of Capacitive Coupling to the Design of an Absolute-Coordinate Pointing Device," IEEE Transactions on Instrumentation and Measurement, vol. 54, No. 5, Oct. 2005.

* cited by examiner

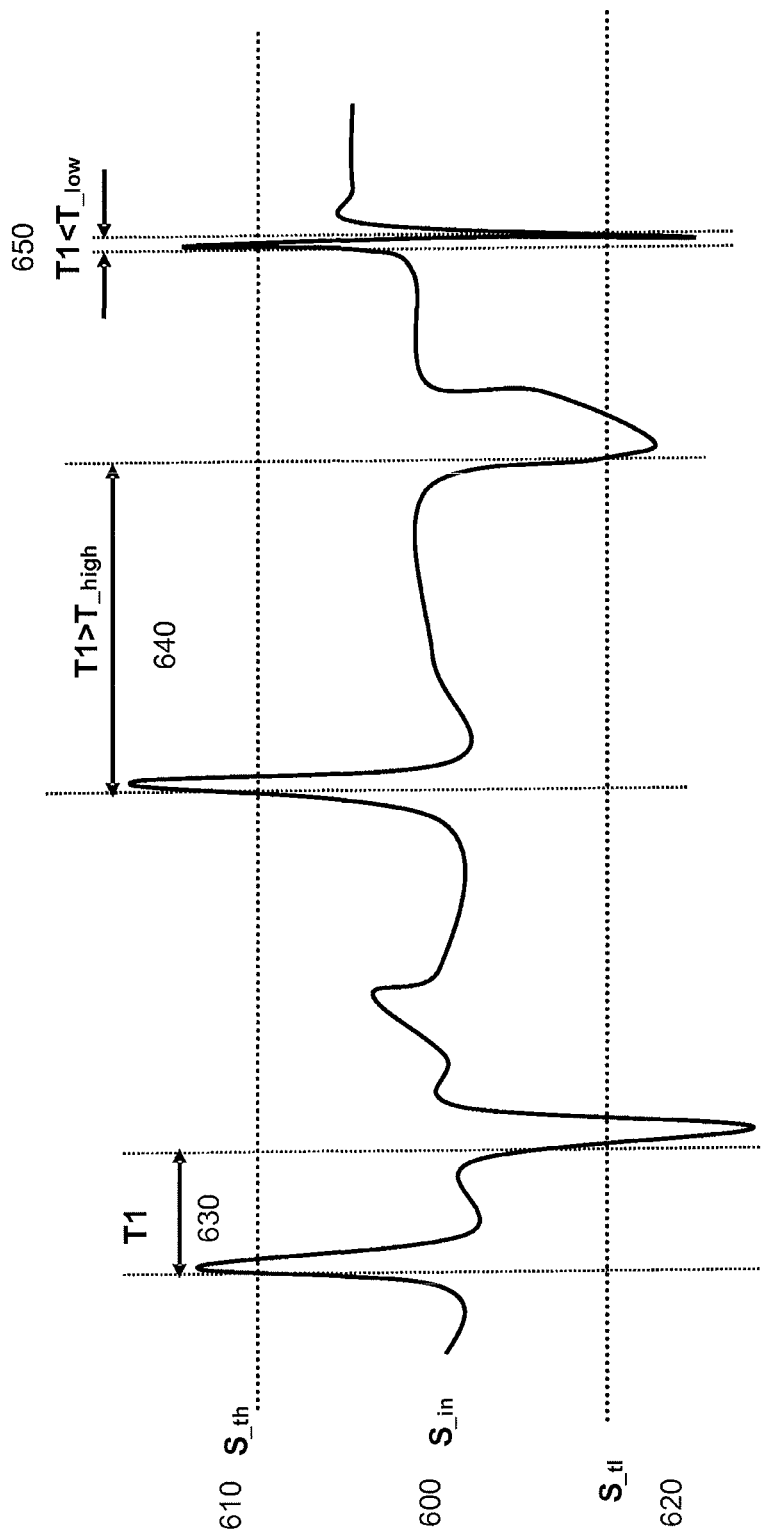

TUNING ALGORITHM FOR NOISE REDUCTION IN AN ACTIVE STYLUS

RELATED APPLICATION

This application is a continuation, under 35 U.S.C. §120, of U.S. patent application Ser. No. 13/427,721, filed 22 Mar. 2012, which claims the benefit, under 35 U.S.C. §119(e), of U.S. Provisional Patent Application Ser. No. 61/553,114, filed 28 Oct. 2011, which are hereby incorporated by reference.

TECHNICAL FIELD

This disclosure generally relates to touch sensors.

BACKGROUND

A touch sensor may detect the presence and location of a touch or object or the proximity of an object (such as a user's finger or a stylus) within a touch-sensitive area of the touch sensor overlaid on a display screen, for example. In a touch sensitive display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, such as, for example, resistive touch screens, surface acoustic wave touch screens, and capacitive touch screens. Herein, reference to a touch sensor may encompass a touch screen, and vice versa, where appropriate. When an object touches or comes within proximity of the surface of the capacitive touch screen, a change in capacitance may occur within the touch screen at the location of the touch or proximity. A touch-sensor controller may process the change in capacitance to determine its position on the touch screen.

BRIEF DESCRIPTION OF THE DRAWINGS

FIG. 6 illustrates an example waveform received by an active stylus.

DESCRIPTION OF EXAMPLE EMBODIMENTS

Figure 1:
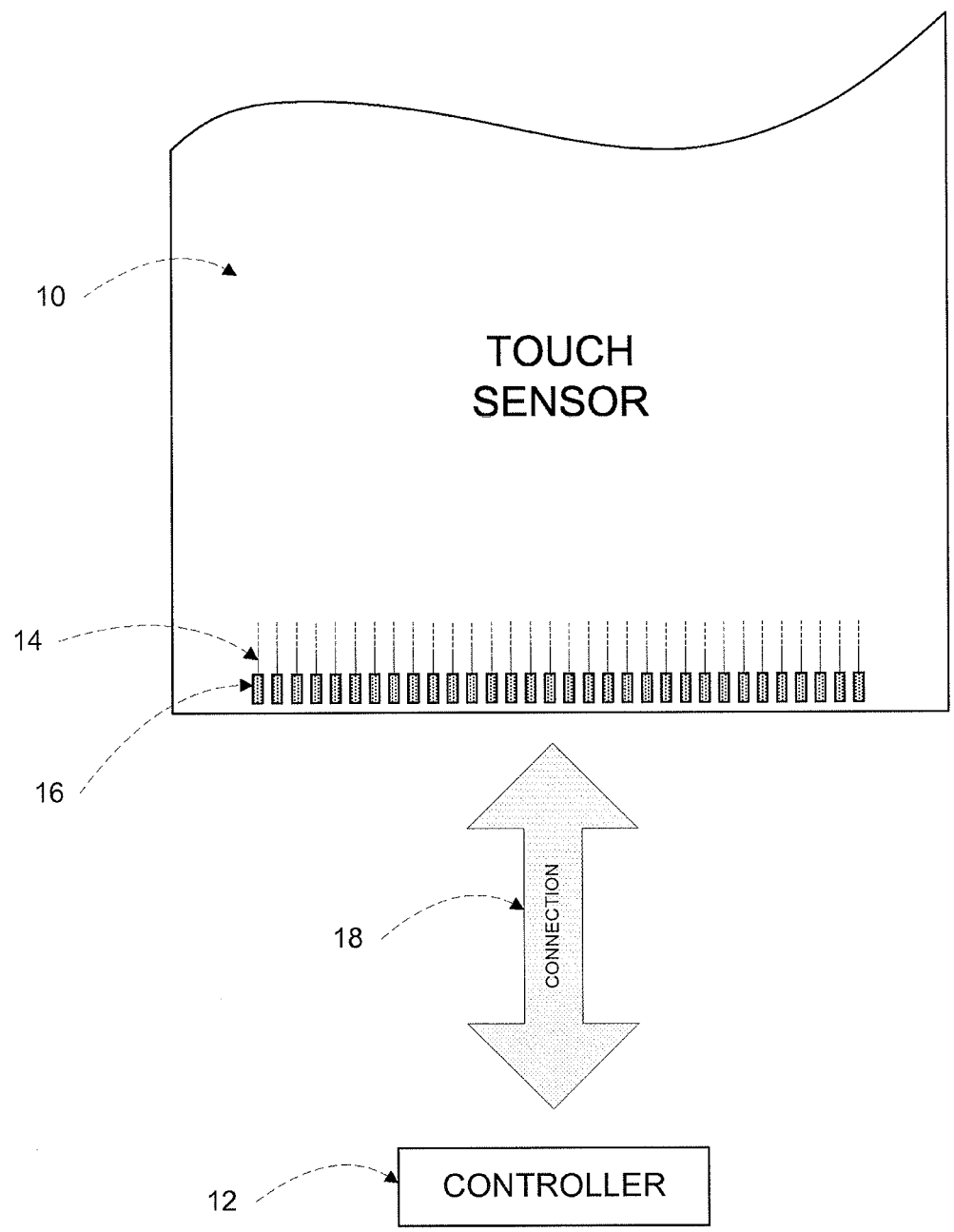
FIG. 1 illustrates an example touch sensor with an example touch-sensor controller.

FIG. 1 illustrates an example touch sensor 10 with an example touch-sensor controller 12. Touch sensor 10 and touch-sensor controller 12 may detect the presence and location of a touch or the proximity of an object within a touch-sensitive area of touch sensor 10. Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 10 may include one or more touch-sensitive areas, where appropriate. Touch sensor 10 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a ground electrode, a guard electrode, a drive electrode, or a sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as 100% fill), where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material, and the fine lines of conductive material may occupy approximately 5% of the area of its shape in a hatched, mesh, or other suitable pattern. Herein, reference to FLM encompasses such material, where appropriate. Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns. Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and touch-sensor controller 12. As an example only and not by way of limitation, the cover panel may have a thickness of approximately 1 millimeter (mm); the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 rum. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 microns (μm) or less and a width of approximately 10 μm or less. As another example, one or more portions of the conductive material may be silver or silver-based and similarly have a thickness of approximately 5 μm or less and a width of approximately 10 μm or less. This disclosure contemplates any suitable electrodes made of any suitable material.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array, touch-sensor controller 12 may determine the position of the touch or proximity within the touch-sensitive area(s) of touch sensor 10.

In a self-capacitance implementation, touch sensor 10 may include an array of electrodes of a single type that may each form a capacitive node. When an object touches or comes within proximity of the capacitive node, a change in self-capacitance may occur at the capacitive node and touch-sensor controller 12 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 12 may determine the position of the touch or proximity within the touch-sensitive area(s) of touch sensor 10. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such one or more central processing units (CPUs)) of a device that includes touch sensor 10 and touch-sensor controller 12, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs), such as for example general-purpose microprocessors, microcontrollers, programmable logic devices or arrays, application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below. The FPC may be active or passive, where appropriate. In particular embodiments, multiple touch-sensor controllers 12 are disposed on the FPC. Touch-sensor controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g. at the edges of) the touch-sensitive area(s) of touch sensor 10. Particular tracks 14 may provide drive connections for coupling touch-sensor controller 12 to drive electrodes of touch sensor 10, through which the drive unit of touch-sensor controller 12 may supply drive signals to the drive electrodes. Other tracks 14 may provide sense connections for coupling touch-sensor controller 12 to sense electrodes of touch sensor 10, through which the sense unit of touch-sensor controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 μm or less. As another example, the conductive material of tracks 14 may be silver or silver-based and have a width of approximately 100 μm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the drive or sense electrodes of touch sensor 10. In other embodiments, connection pads 16 may be connected an electro-mechanical connector (such as a zero insertion force wire-to-board connector). In these embodiments, connection 18 may not need to include an FPC. This disclosure contemplates any suitable connection 18 between touch-sensor controller 12 and touch sensor 10.

Figure 2:
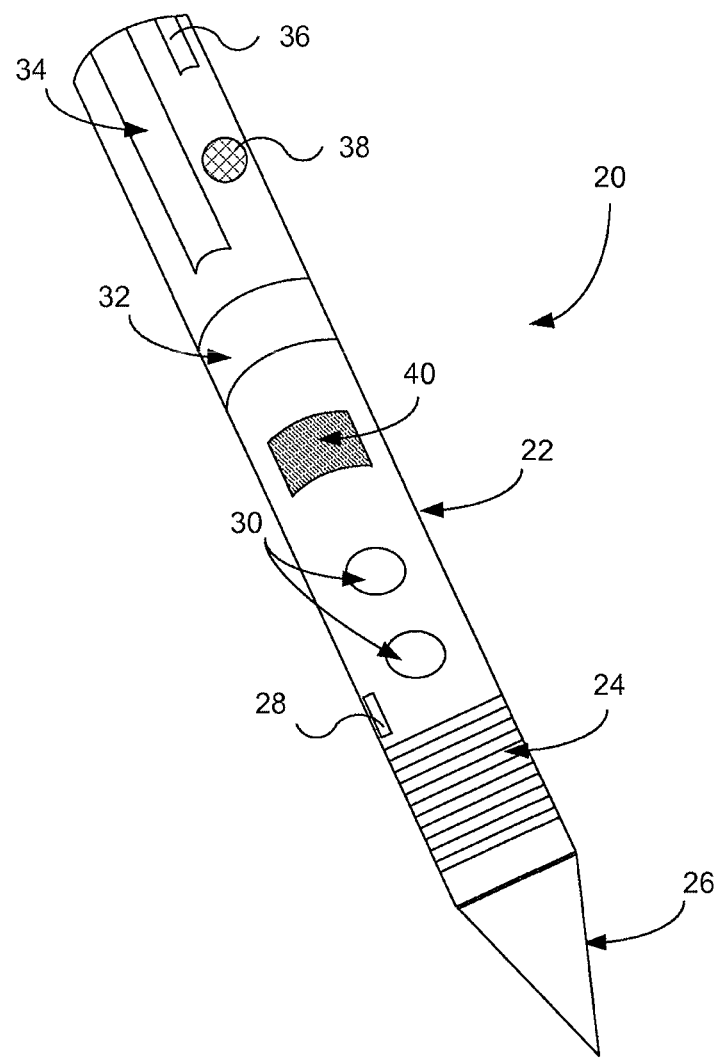
FIG. 2 illustrates an example active stylus exterior.

FIG. 2 illustrates an example exterior of an example active stylus 20. In particular embodiments, active stylus 20 is powered (e.g., by an internal or external power source) and is capable of providing touch or proximity inputs to a touch sensor (e.g., touch sensor 10 illustrated in FIG. 1). Active stylus 20 may include one or more components, such as buttons 30 or sliders 32 and 34 integrated with an outer body 22. These external components may provide for interaction between active stylus 20 and a user or between a device and a user. As an example and not by way of limitation, interactions may include communication between active stylus 20 and a device, enabling or altering functionality of active stylus 20 or a device, or providing feedback to or accepting input from one or more users. The device may by any suitable device, such as, for example and without limitation, a desktop computer, laptop computer, tablet computer, personal digital assistant (PDA), smartphone, satellite navigation device, portable media player, portable game console, kiosk computer, point-of-sale device, or other suitable device. Although this disclosure provides specific examples of particular components configured to provide particular interactions, this disclosure contemplates any suitable component configured to provide any suitable interaction. Active stylus 20 may have any suitable dimensions with outer body 22 made of any suitable material or combination of materials, such as, for example and without limitation, plastic or metal. In particular embodiments, exterior components (e.g. 30 or 32) of active stylus 20 may interact with internal components or programming of active stylus 20 or may initiate one or more interactions with one or more devices or other active styluses 20.

As described above, actuating one or more particular components may initiate an interaction between active stylus 20 and a user or between the device and the user. Components of active stylus 20 may include one or more buttons 30 or one or more sliders 32 and 34. As an example and not by way of limitation, buttons 30 or sliders 32 and 34 may be mechanical or capacitive and may function as a roller, trackball, or wheel. As another example, one or more sliders 32 or 34 may function as a vertical slider 34 aligned along a longitudinal axis of active stylus 20, while one or more wheel sliders 32 may be aligned around the circumference of active stylus 20. In particular embodiments, capacitive sliders 32 and 34 or buttons 30 may be implemented using one or more touch-sensitive areas. Touch-sensitive areas may have any suitable shape, dimensions, location, or be made from any suitable material. As an example and not by way of limitation, sliders 32 and 34 or buttons 30 may be implemented using areas of flexible mesh formed using lines of conductive material. As another example, sliders 32 and 34 or buttons 30 may be implemented using a FPC.

Active stylus 20 may have one or more components configured to provide feedback to or accepting feedback from a user, such as, for example and without limitation, tactile, visual, or audio feedback. Active stylus 20 may include one or more ridges or grooves 24 on its outer body 22. Ridges or grooves 24 may have any suitable dimensions, have any suitable spacing between ridges or grooves, or be located at any suitable area on outer body 22 of active stylus 20. As an example and not by way of limitation, ridges 24 may enhance a user's grip on outer body 22 of active stylus 20 or provide tactile feedback to or accept tactile input from a user. Active stylus 20 may include one or more audio components 38 capable of transmitting and receiving audio signals. As an example and not by way of limitation, audio component 38 may contain a microphone capable of recording or transmitting one or more users' voices. As another example, audio component 38 may provide an auditory indication of a power status of active stylus 20. Active stylus 20 may include one or more visual feedback components 36, such as a light-emitting diode (LED) indicator or electrophoretic ink (E-Ink). As an example and not by way of limitation, visual feedback component 36 may indicate a power status of active stylus 20 to the user.

One or more modified surface areas 40 may form one or more components on outer body 22 of active stylus 20. Properties of modified surface areas 40 may be different than properties of the remaining surface of outer body 22. As an example and not by way of limitation, modified surface area 40 may be modified to have a different texture, temperature, or electromagnetic characteristic relative to the surface properties of the remainder of outer body 22. Modified surface area 40 may be capable of dynamically altering its properties, for example by using haptic interfaces or rendering techniques. A user may interact with modified surface area 40 to provide any suitable functionally. For example and not by way of limitation, dragging a finger across modified surface area 40 may initiate an interaction, such as data transfer, between active stylus 20 and a device.

One or more components of active stylus 20 may be configured to communicate data between active stylus 20 and the device. For example, active stylus 20 may include one or more tips 26 or nibs. Tip 26 may include one or more electrodes configured to communicate data between active stylus 20 and one or more devices or other active styluses. Tip 26 may provide or communicate pressure information (e.g., the amount of pressure being exerted by active stylus 20 through tip 26) between active stylus 20 and one or more devices or other active styluses. Tip 26 may be made of any suitable material, such as a conductive material, and have any suitable dimensions, such as, for example, a diameter of 1 mm or less at its terminal end. Active stylus 20 may include one or more ports 28 located at any suitable location on outer body 22 of active stylus 20. Port 28 may be configured to transfer signals or information between active stylus 20 and one or more devices or power sources via, for example, wired coupling. Port 28 may transfer signals or information by any suitable technology, such as, for example, by universal serial bus (USB) or Ethernet connections. Although this disclosure describes and illustrates a particular configuration of particular components with particular locations, dimensions, composition and functionality, this disclosure contemplates any suitable configuration of suitable components with any suitable locations, dimensions, composition, and functionality with respect to active stylus 20.

Figure 3:
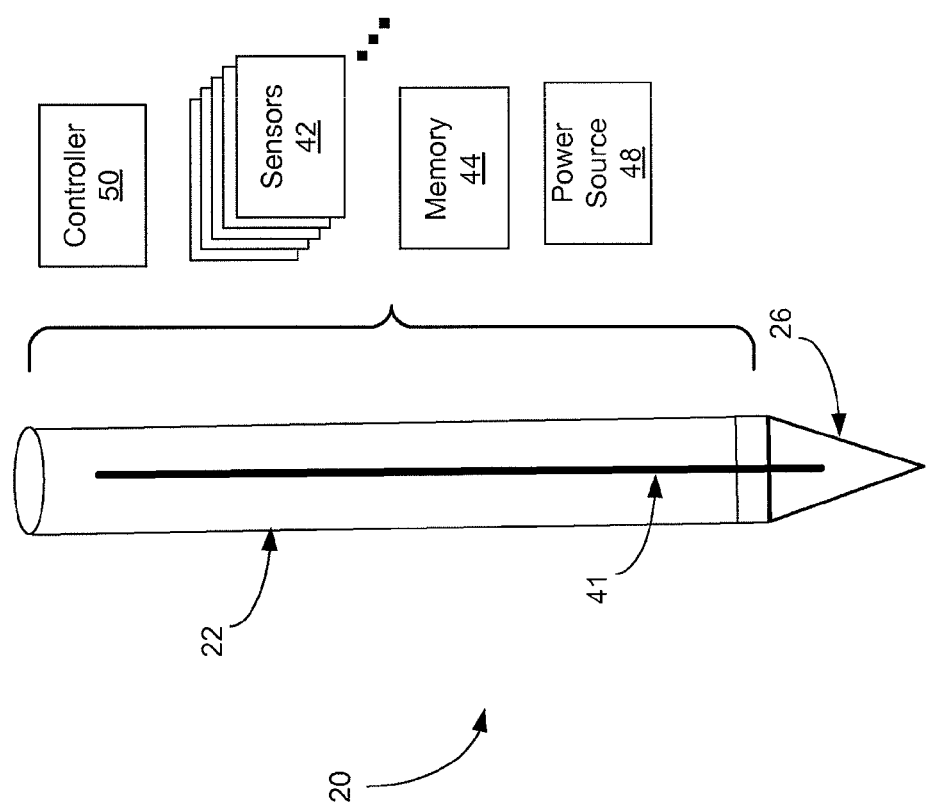
FIG. 3 illustrates an example active stylus interior.

FIG. 3 illustrates example internal components of example active stylus 20. Active stylus 20 includes one or more internal components, such as a controller 50, sensors 42, memory 44, or power source 48. In particular embodiments, one or more internal components may be configured to provide for interaction between active stylus 20 and a user or between a device and a user. In other particular embodiments, one or more internal components, in conjunction with one or more external components described above, may be configured to provide interaction between active stylus 20 and a user or between a device and a user. As an example and not by way of limitation, interactions may include communication between active stylus 20 and a device, enabling or altering functionality of active stylus 20 or a device, or providing feedback to or accepting input from one or more users. As another example, active stylus 20 may communicate via any applicable short distance, low energy data transmission or modulation link, such as, for example and without limitation, via a radio frequency (RF) communication link. In this case, active stylus 20 includes a RF device for transmitting data over the RF link.

Controller 50 may be a microcontroller or any other type of processor suitable for controlling the operation of active stylus 20. Controller 50 may be one or more ICs—such as, for example, general-purpose microprocessors, microcontrollers, PLDs, PLAs, or ASICs. Controller 50 may include a processor unit, a drive unit, a sense unit, and a storage unit. The drive unit may supply signals to electrodes of tip 26 through center shaft 41. The drive unit may also supply signals to control or drive sensors 42 or one or more external components of active stylus 20. The sense unit may sense signals received by electrodes of tip 26 through center shaft 41 and provide measurement signals to the processor unit representing input from a device. The sense unit may also sense signals generated by sensors 42 or one or more external components and provide measurement signals to the processor unit representing input from a user. The processor unit may control the supply of signals to the electrodes of tip 26 and process measurement signals from the sense unit to detect and process input from the device. The processor unit may also process measurement signals from sensors 42 or one or more external components. The storage unit may store programming for execution by the processor unit, including programming for controlling the drive unit to supply signals to the electrodes of tip 26, programming for processing measurement signals from the sense unit corresponding to input from the device, programming for processing measurement signals from sensors 42 or external components to initiate a pre-determined function or gesture to be performed by active stylus 20 or the device, and other suitable programming, where appropriate. As an example and not by way of limitation, programming executed by controller 50 may electronically filter signals received from the sense unit. Although this disclosure describes a particular controller 50 having a particular implementation with particular components, this disclosure contemplates any suitable controller having any suitable implementation with any suitable components.

In particular embodiments, active stylus 20 may include one or more sensors 42, such as touch sensors, gyroscopes, accelerometers, contact sensors, or any other type of sensor that detect or measure data about the environment in which active stylus 20 operates. Sensors 42 may detect and measure one or more characteristic of active stylus 20, such as acceleration or movement, orientation, contact, pressure on outer body 22, force on tip 26, vibration, or any other suitable characteristic of active stylus 20. As an example and not by way of limitation, sensors 42 may be implemented mechanically, electronically, or capacitively. As described above, data detected or measured by sensors 42 communicated to controller 50 may initiate a pre-determined function or gesture to be performed by active stylus 20 or the device. In particular embodiments, data detected or received by sensors 42 may be stored in memory 44. Memory 44 may be any form of memory suitable for storing data in active stylus 20. In other particular embodiments, controller 50 may access data stored in memory 44. As an example and not by way of limitation, memory 44 may store programming for execution by the processor unit of controller 50. As another example, data measured by sensors 42 may be processed by controller 50 and stored in memory 44.

Power source 48 may be any type of stored-energy source, including electrical or chemical-energy sources, suitable for powering the operation of active stylus 20. In particular embodiments, power source 48 may be charged by energy from a user or device. As an example and not by way of limitation, power source 48 may be a rechargeable battery that may be charged by motion induced on active stylus 20. In other particular embodiments, power source 48 of active stylus 20 may provide power to or receive power from the device or other external power source. As an example and not by way of limitation, power may be inductively transferred between power source 48 and a power source of the device or another external power source, such as a wireless power transmitter. Power source may also be powered by a wired connection through an applicable port coupled to a suitable power source.

Figure 4:
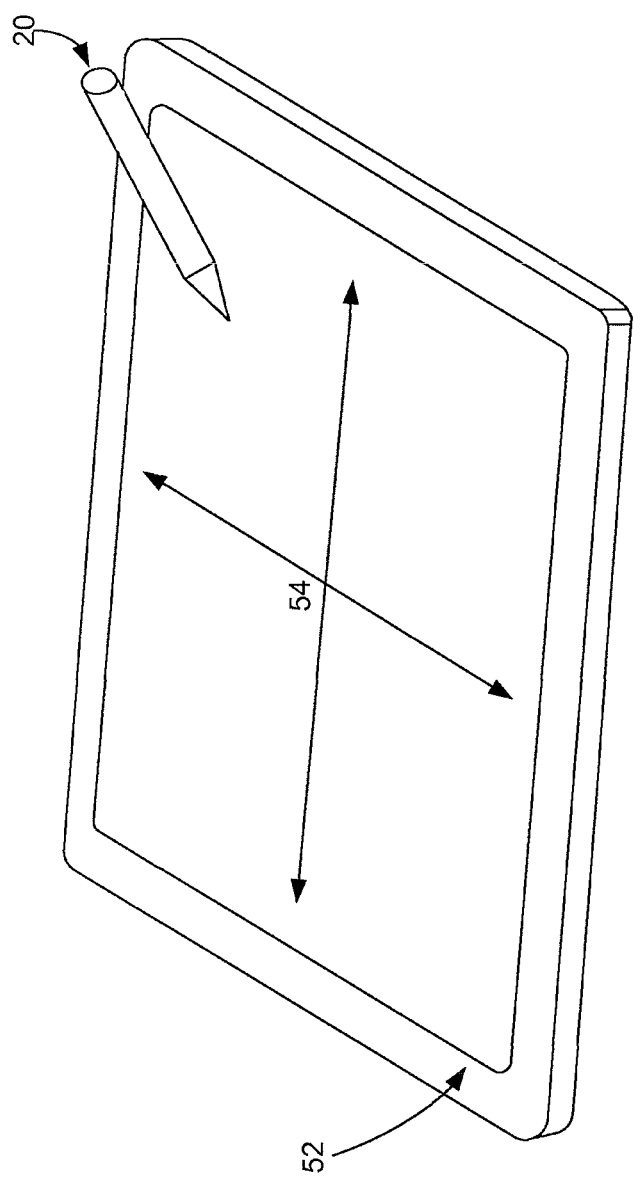
FIG. 4 illustrates an example active stylus with touch sensor device.

FIG. 4 illustrates an example active stylus 20 with an example device 52. Device 52 may have a display (not shown) and a touch sensor with a touch-sensitive area 54. Device 52 display may be a liquid crystal display (LCD), a LED display, a LED-backlight LCD, or other suitable display and may be visible though a cover panel and substrate (and the drive and sense electrodes of the touch sensor disposed on it) of device 52. Although this disclosure describes a particular device display and particular display types, this disclosure contemplates any suitable device display and any suitable display types.

Device 52 electronics may provide the functionality of device 52. As example and not by way of limitation, device 52 electronics may include circuitry or other electronics for wireless communication to or from device 52, execute programming on device 52, generating graphical or other user interfaces (UIs) for device 52 display to display to a user, managing power to device 52 from a battery or other power source, taking still pictures, recording video, other suitable functionality, or any suitable combination of these. Although this disclosure describes particular device electronics providing particular functionality of a particular device, this disclosure contemplates any suitable device electronics providing any suitable functionality of any suitable device.

In particular embodiments, active stylus 20 and device 52 may be synchronized prior to communication of data between active stylus 20 and device 52. As an example and not by way of limitation, active stylus 20 may be synchronized to device 52 through a pre-determined bit sequence transmitted by the touch sensor of device 52. As another example, active stylus 20 may be synchronized to device by processing the drive signal transmitted by drive electrodes of the touch sensor of device 52. Active stylus 20 may interact or communicate with device 52 when active stylus 20 is brought in contact with or in proximity to touch-sensitive area 54 of the touch sensor of device 52. In particular embodiments, interaction between active stylus 20 and device 52 may be capacitive or inductive. As an example and not by way of limitation, when active stylus 20 is brought in contact with or in the proximity of touch-sensitive area 54 of device 52, signals generated by active stylus 20 may influence capacitive nodes of touch-sensitive area of device 52 or vice versa. As another example, a power source of active stylus 20 may be inductively charged through the touch sensor of device 52, or vice versa. Although this disclosure describes particular interactions and communications between active stylus 20 and device 52, this disclosure contemplates any suitable interactions and communications through any suitable means, such as mechanical forces, current, voltage, or electromagnetic fields.

In particular embodiments, measurement signal from the sensors of active stylus 20 may initiate, provide for, or terminate interactions between active stylus 20 and one or more devices 52 or one or more users, as described above. Interaction between active stylus 20 and device 52 may occur when active stylus 20 is contacting or in proximity to device 52. As an example and not by way of limitation, a user may perform a gesture or sequence of gestures, such as shaking or inverting active stylus 20, whilst active stylus 20 is hovering above touch-sensitive area 54 of device 52. Active stylus may interact with device 52 based on the gesture performed with active stylus 20 to initiate a pre-determined function, such as authenticating a user associated with active stylus 20 or device 52. Although this disclosure describes particular movements providing particular types of interactions between active stylus 20 and device 52, this disclosure contemplates any suitable movement influencing any suitable interaction in any suitable way.

Active stylus 20 may receive signals from external sources, including device 52, a user, or another active stylus. Active stylus 20 may encounter noise when receiving such signals. As examples, noise may be introduced into the received signals from data quantization, limitations of position-calculation algorithms, bandwidth limitations of measurement hardware, accuracy limitations of analog front ends of devices with which active stylus 20 communicates, the physical layout of the system, sensor noise, charger noise, device noise, stylus circuitry noise, or external noise. The overall noise external to active stylus 20 may have frequency characteristics covering a wide range of the spectrum, including narrow band noise and wide band noise, as well.

In particular embodiments, a signal S is received by one or more electrodes capable of sensing signals in active stylus 20. These electrodes may reside on active stylus tip 26. The signal S received by the electrodes in active stylus 20 may then be transmitted from the electrodes to controller 50. In particular embodiments, signal S is transmitted to controller 50 via center shaft 41. Controller 50, as discussed above, may include, without limitation, a drive unit, a sense unit, a storage unit, and a processor unit. In particular embodiments, received signal S may be amplified by any suitable amplifier, including a digital or an analog amplifier. After the signal S is amplified, it may be filtered by a filter. In some embodiments, the filter may be an analog filter including analog circuit components, such as one or more resistors, capacitors, or inductors. In other embodiments, the filter may be a digital filter, such as a finite-impulse-response (FIR) filter, or a Kalman filter implemented, for example, on a processor. The filter may be any suitable filter for any type of processing of the received signal (e.g., signal S), including, for example, a filter for noise reduction. The filter may be, for example and without limitation, a low pass filter, a band pass filter, or a high pass filter, and it may be implemented in either the time domain or the frequency domain. In particular embodiments, the filter may be a band pass filter whose frequency characteristics are designed to attenuate noise and amplify a signal. The filter may also be used to boost signal strength of the received signal at active stylus 20. In particular embodiments, the filter may consist of multiple filters operating as a single filter with a desired characteristic.

Active stylus 20 may transmit signals based in part on the determination that it has received a signal, and not simply noise, from a signal source. As an example, active stylus 20 may determine whether it has received a signal from device 52 by comparing the received signal to a signal threshold. If the received signal satisfies the threshold requirement (e.g., meets the minimum value of this signal threshold), active stylus 20 may process the received signal, including, for example, amplifying or phase-shifting the received signal, in order to create a transmit signal to transmit back to device 52 via electrodes in tip 26. If the received signal does not satisfy the threshold requirement, active stylus 20 may not process the received signal further. In particular embodiments, logic in active stylus 20 including, for example, a comparator (either alone or in combination with or as part of a processor), determines whether the threshold is met by the received signal. If the threshold is met, the received signal may be sent to additional logic for processing including, for example, filtering of the received signal. The additional logic may be, without limitation, a processor, a controller (and in particular embodiments, the same controller or processor may contain the logic and the additional logic), or analog circuitry. If the threshold is not met, the received signal may not be sent to the additional logic for processing. It may be desirable for active stylus 20 to, for example, dynamically adjust the threshold for determining that a received signal contains a signal from device 52, or any other signal source, and not merely noise. As an example, if the signal threshold is too low, active stylus 20 may incorrectly determine that a pure noise signal is actually a signal from device 52, proceed to process the noise signal, and incorrectly transmit a response signal. As another example, if signal threshold is too high, active stylus 20 may incorrectly determine that a signal from device 52 is purely a noise signal and fail to process the received signal and transmit a response signal. The threshold adjustment may be based on some factors and may be done dynamically. As described herein, more than one threshold may be employed by active stylus 20 to reduce the effects of noise.

In particular embodiments, active stylus 20 may employ a tuning algorithm in order to more reliably sense and respond to a received signal. As an example, active stylus 20 may employ a tuning algorithm that allows it to avoid transmitting a signal in response to a noise source such as a charger, which may have a frequency that is close to the frequency of a signal source (such as, for example, device 52). The tuning algorithm employed by active stylus 20 may be implemented in one or more parts of controller 50, and may involve the transmission or receipt of data from sensors 42 or memory 44.

In particular embodiments, the tuning algorithm includes thresholding of the received signal, including, for example, amplitude-based thresholding. As described above, if, for example, the amplitude of the received signal (or any processed version of the received signal) does not meet or exceed the threshold, the received signal is determined to be noise and not a signal from a signal source (e.g. device 52). As another example, if the amplitude of the received signal does not fall below the threshold, the received signal is determined to be noise and not a signal from a signal source. Thus, one manner in which active stylus 20 may reduce erroneous transmissions in response to noise is to require that received signals meet, exceed, or fall below a threshold before they are further processed by active stylus 20. This may be interpreted as one type of noise-reduction filter for active stylus 20.

In other embodiments, the tuning algorithm includes analyzing the temporal characteristics of the received signal, including, for example, the period of the received signal. Active stylus 20 may analyze, in the time domain and in real-time, the period of a received signal in order to determine whether the received signal is from a signal source or noise source. The tuning algorithm may be used to restrict the signals processed by active stylus 20 to those signals that fall into a certain temporal band. As an example, if active stylus 20 has information about the range of time periods of the signals generated by device 52 (or, alternatively, the frequency range of those signals generated by device 52), it may compare the period of the received signal to the period range of device 52 and determine if the received signal was generated by device 52 or by a noise source.

Figure 5:
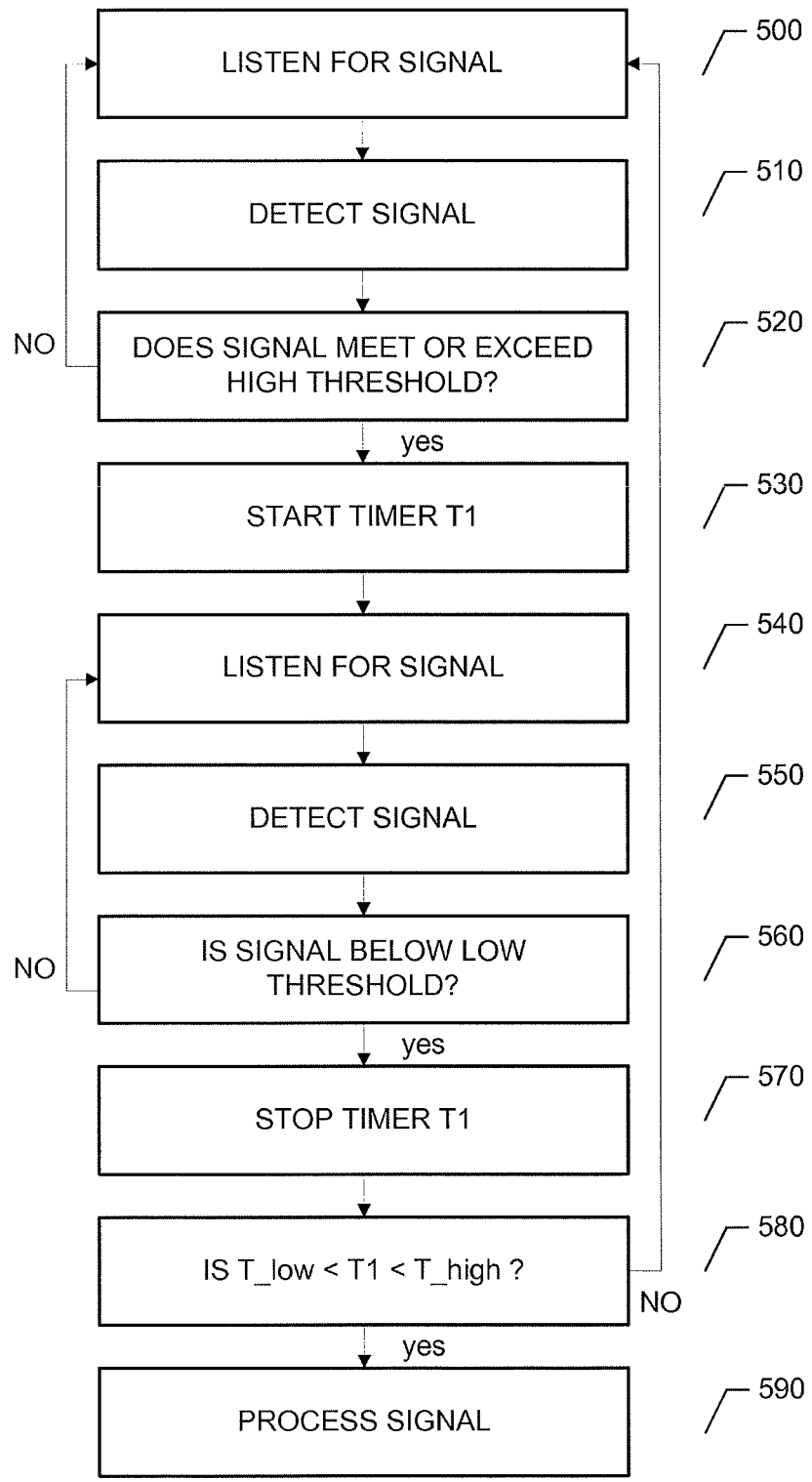
FIG. 5 illustrates an example method for noise reduction in an active stylus.

In yet other embodiments, the tuning algorithm includes both thresholding and analyzing the temporal characteristics of the received signal. FIG. 5 illustrates an example method for such a tuning algorithm. The method may start at step 500, where active stylus 20 listens for a signal. At step 510, active stylus 20 detects a received signal. At step 520, active stylus 20 determines whether the received signal meets or exceeds a high amplitude threshold. If, at step 520, the high amplitude threshold is not met or exceeded, the method returns to step 500, where active stylus again listens for a signal. If, at step 520, the high amplitude threshold is met or exceeded, then at step 530, timer T1 (a measurement of the period of the received signal) is started. At step 540, active stylus 20 continues to listen for a signal. At step 550, active stylus 20 again detects a signal. At step 560, active stylus 20 determines whether the signal detected at step 550 is below a low amplitude threshold. If, at step 560, the signal is not below the low amplitude threshold, the method returns to step 540, where active stylus 20 continues to listen for signals. In other example embodiments, if, at step 560, the signal is not below the low amplitude threshold and if the duration of timer T1 reaches a predetermined time-out value, the method returns to step 500. If, however, at step 560, the signal is below the low amplitude threshold, then the method proceeds to step 570, where active stylus 20 stops timer T1. At step 580, active stylus 20 compares the measured period of the received signal, T1, to predetermined values T_low and T_high. If T1 does not fall within the range of values between T_low and T_high, then the method returns to step 500, where active stylus 20 once again listens for a signal. If, however, T1 does fall in the range of values between T_low and T_high, then the received signal is determined to be a signal (and not noise) and will be processed further by active stylus 20.

In yet other embodiments, the method of FIG. 5 may include the use of two amplitude thresholds that must both be met or exceeded by the received signal in order for the received signal to be processed further by active stylus 20. In yet other embodiments, the method of FIG. 5 may include the use of two amplitude thresholds below which the received signal must fall in order for the received signal to be processed further by active stylus 20. In still other embodiments, the method of FIG. 5 may include the use of two amplitude thresholds, the first being a low amplitude threshold below which the received signal must fall, and the second being a high amplitude threshold which must be met or exceeded by the received signal in order for the received signal to be processed further by active stylus 20. In general, any combination of low or high amplitude thresholds may be used in different embodiments, as signal polarities may be reversed either by active stylus 20 or device 52.

Particular embodiments may repeat the steps of the method of FIG. 5, where appropriate. Moreover, although this disclosure describes and illustrates particular steps of the method of FIG. 5 as occurring in a particular order, this disclosure contemplates any suitable steps of the method of FIG. 5 occurring in any suitable order. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

FIG. 6 illustrates three sample timing periods, numbered 630, 640, and 650, respectively, each determined by use of the method illustrated in FIG. 5. Once the received signal 600 crosses the high amplitude threshold 610, the timing period 630 (T1) is started. The timing period 630 continues until the received signal 600 goes below the low amplitude threshold 620. In the example illustrated in FIG. 6, the duration of timing period 630 falls within the range defined by values T_low and T_high, and therefore the received signal (during timing period 630) will be further processed by active stylus 20. In contrast to timing period 630, the duration of timing period 640 exceeds the value T_high and therefore the received signal during timing period 640 is considered to be noise and will not be further processed by active stylus 20. Similarly, the duration of timing period 650 is less than the value T_low, so the received signal during timing period 650 is considered to be noise and also will not be further processed by active stylus 20.

In particular embodiments of the tuning algorithm, active stylus 20 obtains the values T_low and T_high through communication with device 52 (including, for example, controller 12 in device 52). In other embodiments, active stylus 20 may dynamically determine the values T_low and T-high, for example, based upon current (or previous) values of a received signal. In yet other embodiments, the values of T_low and T_high are pre-loaded on active stylus 20 (e.g. in controller 50 or memory 44). In yet other embodiments, the values of T_low and T_high may be determined based on measurements taken by active stylus 20 during an initialization period. As an example, active stylus 20 may measure the pulse width of signals received from device 52 (e.g. a drive-line pulse width) in order to determine what an acceptable range of values defined by T_low and T_high should be. The values of T_low and T_high may be specific to a particular type of device 52, or may be applicable to a range of devices with which active stylus 20 may communicate. The values of T_low and T_high may correspond to a range within which the periods of signals transmitted by device 52 (or multiple devices) tend to fall.

In particular embodiments of the tuning algorithm implemented in the frequency domain, T_low and T_high may be replaced by values corresponding to a frequency range or band within which the frequencies of signals transmitted by device 52 tend to fall. Additionally, in a frequency-domain implementation of the tuning algorithm, active stylus 20 may perform a full spectrum analysis of received signals and may use a specialized microcontroller to perform this analysis.

In particular embodiments of the tuning algorithm, active stylus 20 may use multiple thresholds to determine whether a received signal is a true signal or noise. Each of the multiple thresholds may correspond to a certain sensor or electrode pattern on active stylus 20. As an example, if many of the electrodes in active stylus tip 26 are configured to be sense electrodes, active stylus 20 may have a stronger received-signal SNR, and a relatively higher received-signal high amplitude threshold value may be used. In contrast, if many of the electrodes in active stylus tip 26 are configured to be drive electrodes, active stylus 20 may have a weaker received-signal SNR, and a relatively lower received-signal high amplitude threshold may be used. In yet other embodiments, each of multiple threshold sets may correspond to signals coming from different sources. As an example, active stylus 20 may have three different threshold sets (each set potentially having multiple thresholds) in order to accurately receive signals from three different drive-lines on device 52; this may be desirable to increase the robustness of the turning algorithm.

The threshold or thresholds used by active stylus 20 in particular embodiments of the tuning algorithm may be obtained through communication with device 52 (including, for example, controller 12 in device 52). In other embodiments, the threshold value(s) may be pre-loaded on active stylus 20 (e.g. in controller 50 or memory 44). In yet other embodiments, the threshold value(s) may be determined based on measurements taken by active stylus 20 during operation or during an initialization period. As an example, a user of active stylus 20 may initialize and configure threshold value(s) by performing a pre-determined series of actions, e.g. turning on active stylus 20, performing a set number of tapping motions, and listening for a transmission from device 52.

In particular embodiments of the tuning algorithm, a moving-window average may be used when determining whether a received signal is a true signal or noise. As an example, when comparing the received signal to an amplitude threshold, rather than using a single value of the received signal to make the comparison, a moving average of multiple values of the received signal may be used. As a further example, in a moving window of size two, the previous and current values (or the magnitude of these values) of the received signal are averaged together, and that value is then compared to a signal threshold. This may increase the robustness of the operation of active stylus 20 by removing jitter in the system.

Herein, reference to a computer-readable non-transitory storage medium or media may include one or more semiconductor-based or other integrated circuits (ICs) (such as, for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy disks, floppy disk drives (FDDs), magnetic tapes, holographic storage media, solid-state drives (SSDs), RAM-drives, SECURE DIGITAL cards, SECURE DIGITAL drives, any another suitable computer-readable non-transitory storage media, or a suitable combination of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
receiving a signal at a stylus, the stylus being operable to wirelessly transmit signals to and receive signals from a device, the stylus comprising a plurality of electrodes disposed in a tip of the stylus;
calculating, based at least in part on a first value of the signal and a second value of the signal, a first average value of the signal;
comparing the first average value of the signal to a first threshold;
determining whether to start a timing period based at least in part on comparing the first average value of the signal to the first threshold;
if the timing period is started:
calculating, based at least in part on a third value of the signal and a fourth value of the signal, a second average value of the signal;
comparing the second average value of the signal to a second threshold;
determining whether to stop the timing period based at least in part on comparing the second average value of the signal to the second threshold;
if the timing period is stopped:
determining whether a duration of the timing period is within a pre-determined range of timing period values; and
processing the signal if the duration of the timing period is within the pre-determined range of timing period values.

2. The method of Claim 1, further comprising receiving a second signal at the stylus if:
the timing period is not started;
the duration of the timing period meets or exceeds a pre-determined time-out length if the timing period is started and is not stopped, or
the duration of the timing period is not within the pre-determined range of timing period values if the timing period is started and is stopped.

3. The method of Claim 1, further comprising:
calculating, based at least in part on a fifth value of the signal and a sixth value of the signal, a third average value of the signal;
comparing the third average value of the signal to the second threshold if the timing period is not stopped; and
determining whether to stop the timing period based at least in part on comparing the third average value of the signal to the second threshold.

4. The method of Claim 1, wherein one or more of the first, second, third, or fourth values of the signal are the same.

5. The method of Claim 1, wherein the first and second thresholds and the pre-determined range of timing period values are determined during an initialization period.

6. The method of Claim 1, wherein the first and second thresholds and the pre-determined range of timing period values are determined dynamically during operation of the stylus, based at least in part on the signal.

7. The method of Claim 1, wherein the stylus further comprises one or more computer-readable non-transitory storage media embodying logic that is operable when executed to process signals wirelessly received from the device.

8. One or more computer-readable non-transitory storage media embodying logic that is operable when executed to:
receive a signal at a stylus, the stylus being operable to wirelessly transmit signals to and receive signals from a device, the stylus comprising a plurality of electrodes disposed in a tip of the stylus and the media;
calculate, based at least in part on a first value of the signal and a second value of the signal, a first average value of the signal;
compare the first average value of the signal to a first threshold;
determine whether to start a timing period based at least in part on comparing the first average value of the signal to the first threshold;
if the timing period is started:
calculate, based at least in part on a third value of the signal and a fourth value of the signal, a second average value of the signal;
compare the second average value of the signal to a second threshold;
determine whether to stop the timing period based at least in part on comparing the second average value of the signal to the second threshold;
if the timing period is stopped:
determine whether a duration of the timing period is within a pre-determined range of timing period values; and
process the signal if the duration of the timing period is within the pre-determined range of timing period values.

9. The media of Claim 8, the logic further operable when executed to receive a second signal at the stylus if:
the timing period is not started;
the duration of the timing period meets or exceeds a pre-determined time-out length if the timing period is started and is not stopped, or
the duration of the timing period is not within the pre-determined range of timing period values if the timing period is started and is stopped.

10. The media of Claim 8, the logic further operable when executed to:
calculate, based at least in part on a fifth value of the signal and a sixth value of the signal, a third average value of the signal;
compare the third average value of the signal to the second threshold if the timing period is not stopped; and
determine whether to stop the timing period based at least in part on comparing the third average value of the signal to the second threshold.

11. The media of Claim 8, wherein one or more of the first, second, third, or fourth values of the signal are the same.

12. The media of Claim 8, wherein the first and second thresholds and the pre-determined range of timing period values are determined during an initialization period.

13. The media of Claim 8, wherein the first and second thresholds and the pre-determined range of timing period values are determined dynamically during operation of the stylus, based at least in part on the signal.

14. A stylus comprising:
a plurality of electrodes disposed in a tip of the stylus;
wherein the stylus is operable to:
wirelessly transmit signals to and receive signals from a device;
calculate, based at least in part on a first value of the signal and a second value of the signal, a first average value of the signal;
compare the first average value of the signal to a first threshold;
determine whether to start a timing period based at least in part on comparing the first average value of the signal to the first threshold;

if the timing period is started;
  calculate, based at least in part on a third value of the signal and a fourth value of the signal, a second average value of the signal;
  compare the second average value of the signal to a second threshold;
  determine whether to stop the timing period based at least in part on comparing the second average value of the signal to the second threshold;
if the timing period is stopped;
  determine whether a duration of the timing period is within a pre-determined range of timing period values; and
  process the signal if the duration of the timing period is within the pre-determined range of timing period values.

15. The stylus of claim 14, wherein the stylus is further operable to receive a second signal if:
  the timing period is not started;
  the duration of the timing period meets or exceeds a pre-determined time-out length if the timing period is started and is not stopped, or
  the duration of the timing period is not within the pre-determined range of timing period values if the timing period is started and is stopped.

16. The stylus of Claim 14, wherein the stylus is further operable to:
  calculate, based at least in part on a fifth value of the signal and a sixth value of the signal, a third average value of the signal;
  compare the third average value of the signal to the second threshold if the timing period is not stopped; and
  determine whether to stop the timing period based at least in part on comparing the third average value of the signal to the second threshold.

17. The stylus of Claim 14, wherein one or more of the first, second, third, or fourth values of the signal are the same.

18. The stylus of Claim 14, wherein the first and second thresholds and the pre-determined range of timing period values are determined during an initialization period.

19. The stylus of Claim 14, wherein the first and second thresholds and the pre-determined range of timing period values are determined dynamically during operation of the stylus, based at least in part on the signal.

20. The stylus of Claim 14, wherein the stylus further comprises one or more computer-readable non-transitory storage media embodying logic that is operable when executed to process signals wirelessly received from the device.

* * * * *